United States Patent [19]
Allen

[11] Patent Number: 5,848,713
[45] Date of Patent: Dec. 15, 1998

[54] PALLET RETURN STORAGE SYSTEM

[75] Inventor: Donald R. Allen, Hopewell, N.J.

[73] Assignee: Frazier Industrial Company, Long Valley, N.J.

[21] Appl. No.: 550,789

[22] Filed: Oct. 31, 1995

[51] Int. Cl.⁶ .................................................. A47F 5/00
[52] U.S. Cl. ........................ 211/151; 211/59.2; 414/276
[58] Field of Search .................................. 211/151, 162, 211/59.2, 70.4; 414/276; 193/35 A

[56] References Cited

U.S. PATENT DOCUMENTS

| | | | |
|---|---|---|---|
| 3,312,320 | 4/1967 | Froio | 193/35 A |
| 3,621,960 | 11/1971 | Kornylak | 193/35 A |
| 3,651,911 | 3/1972 | Kornylak | 193/35 A |
| 3,918,561 | 11/1975 | Isacsson | 193/35 A |
| 4,383,598 | 5/1983 | Newman | 193/35 A |
| 4,462,500 | 7/1984 | Konstant et al. | 211/151 |
| 4,723,646 | 2/1988 | Scheneman, Jr. | 193/35 A |
| 4,759,676 | 7/1988 | Hammond | 193/35 A X |
| 4,949,852 | 8/1990 | Allen | 211/151 |
| 5,147,020 | 9/1992 | Scherman et al. | 193/35 A |
| 5,170,896 | 12/1992 | Konstant | 211/151 |
| 5,224,828 | 7/1993 | Lawless et al. | 193/35 A |
| 5,476,180 | 12/1995 | Konstant | 211/151 |

FOREIGN PATENT DOCUMENTS

| | | | |
|---|---|---|---|
| 737821 | 9/1966 | Canada | 211/162 |
| 57-160808 | 10/1982 | Japan | 193/35 A |
| 1155517 | 5/1985 | U.S.S.R. | 193/35 A |
| 1024936 | 4/1966 | United Kingdom | 193/35 A |
| WO 83/03959 | 11/1993 | WIPO | 211/151 |

*Primary Examiner*—Robert W. Gibson, Jr.
*Attorney, Agent, or Firm*—Joseph W. Molasky & Associates

[57] ABSTRACT

A pallet return rack storage system of the pushback type is provided in which wheeled carts are selectively and automatically transferred from a pair of feed rails to a pair of return rails. Also provided is a novel braking means for controlling cart speed and avoiding impact with companion carts.

26 Claims, 10 Drawing Sheets

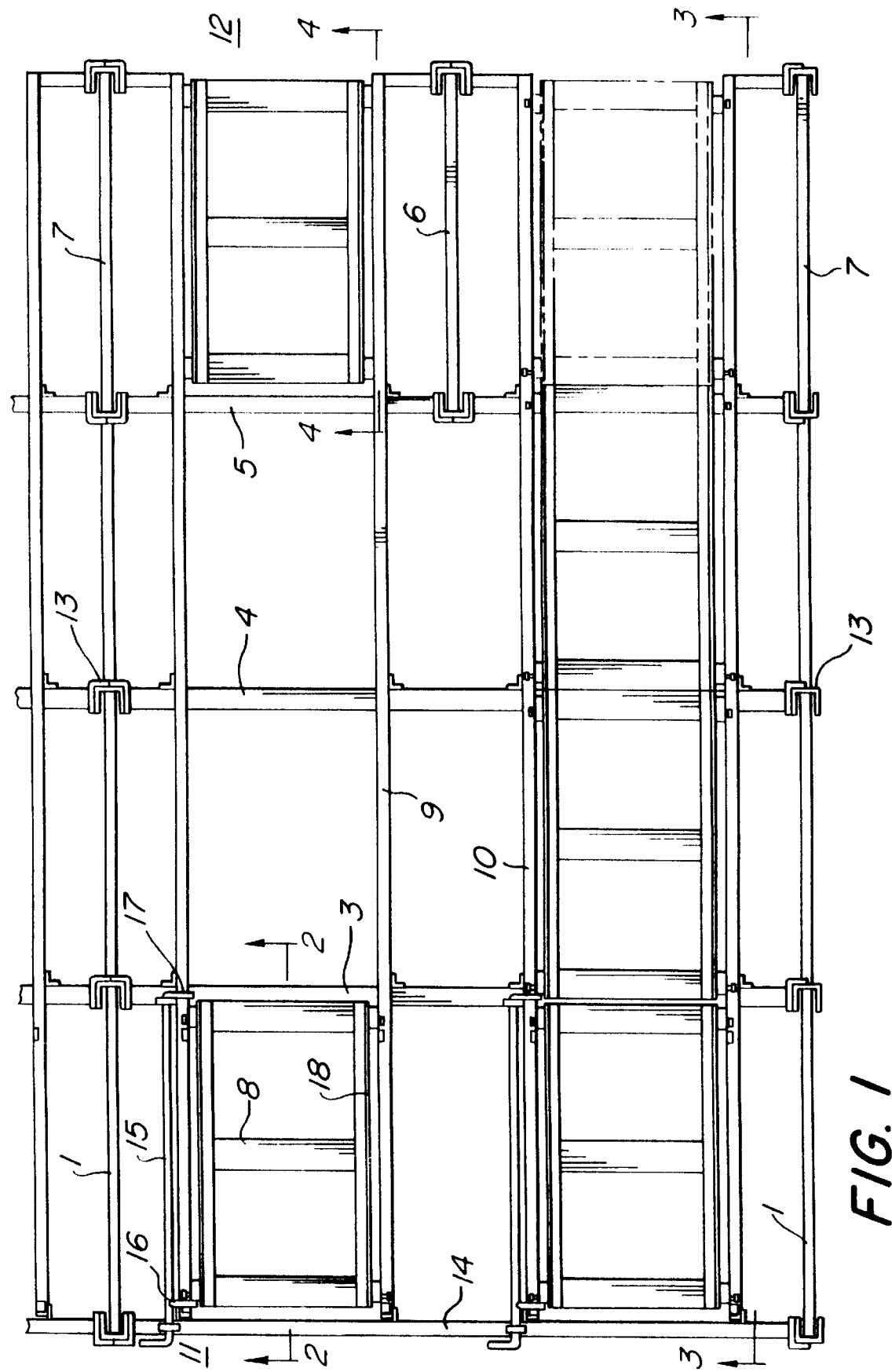

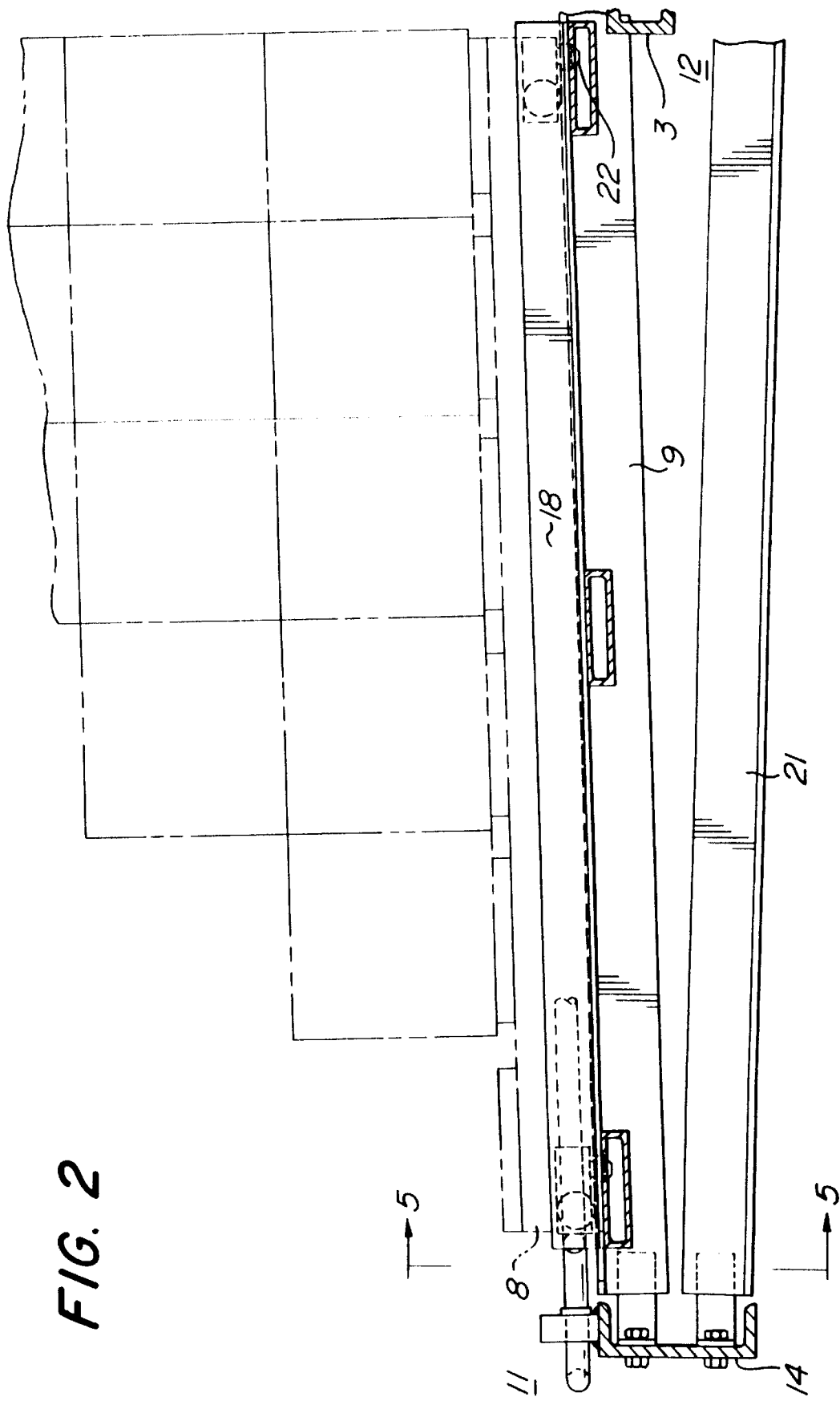

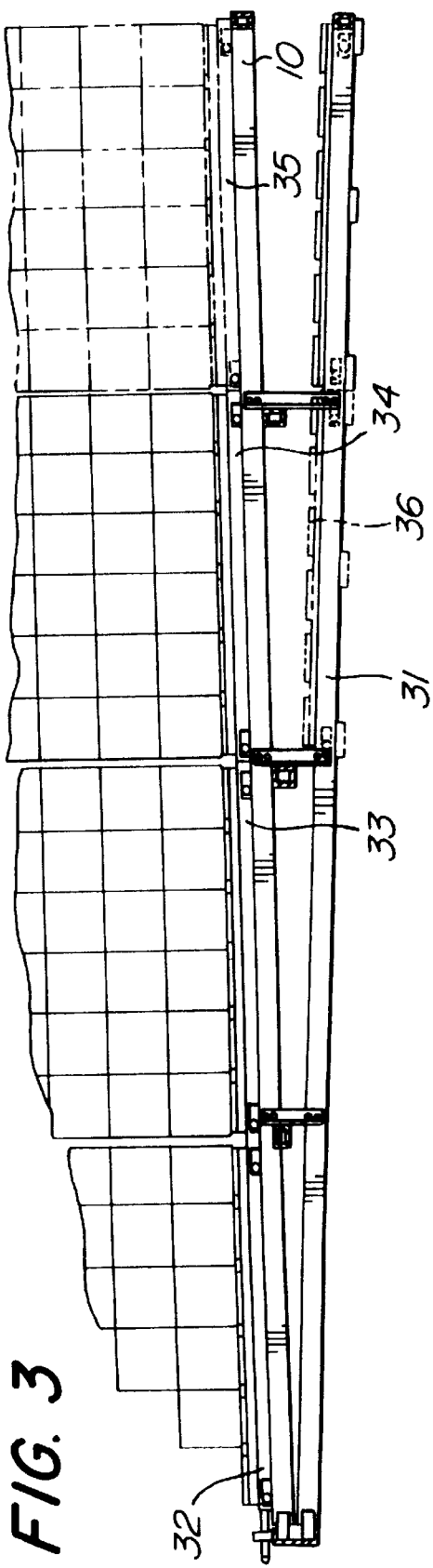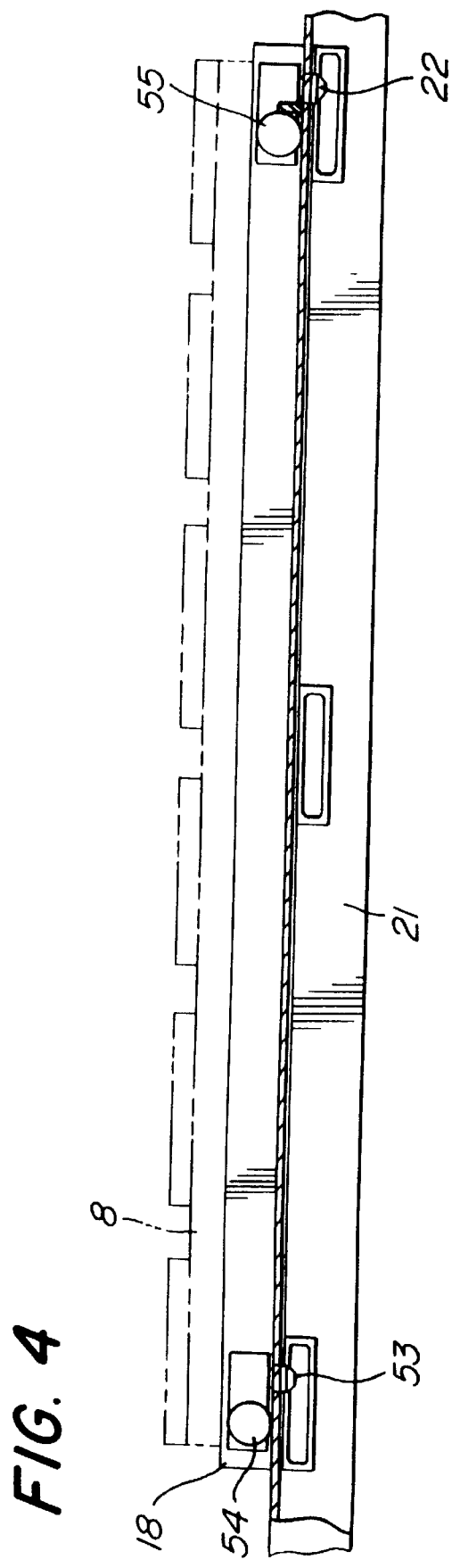

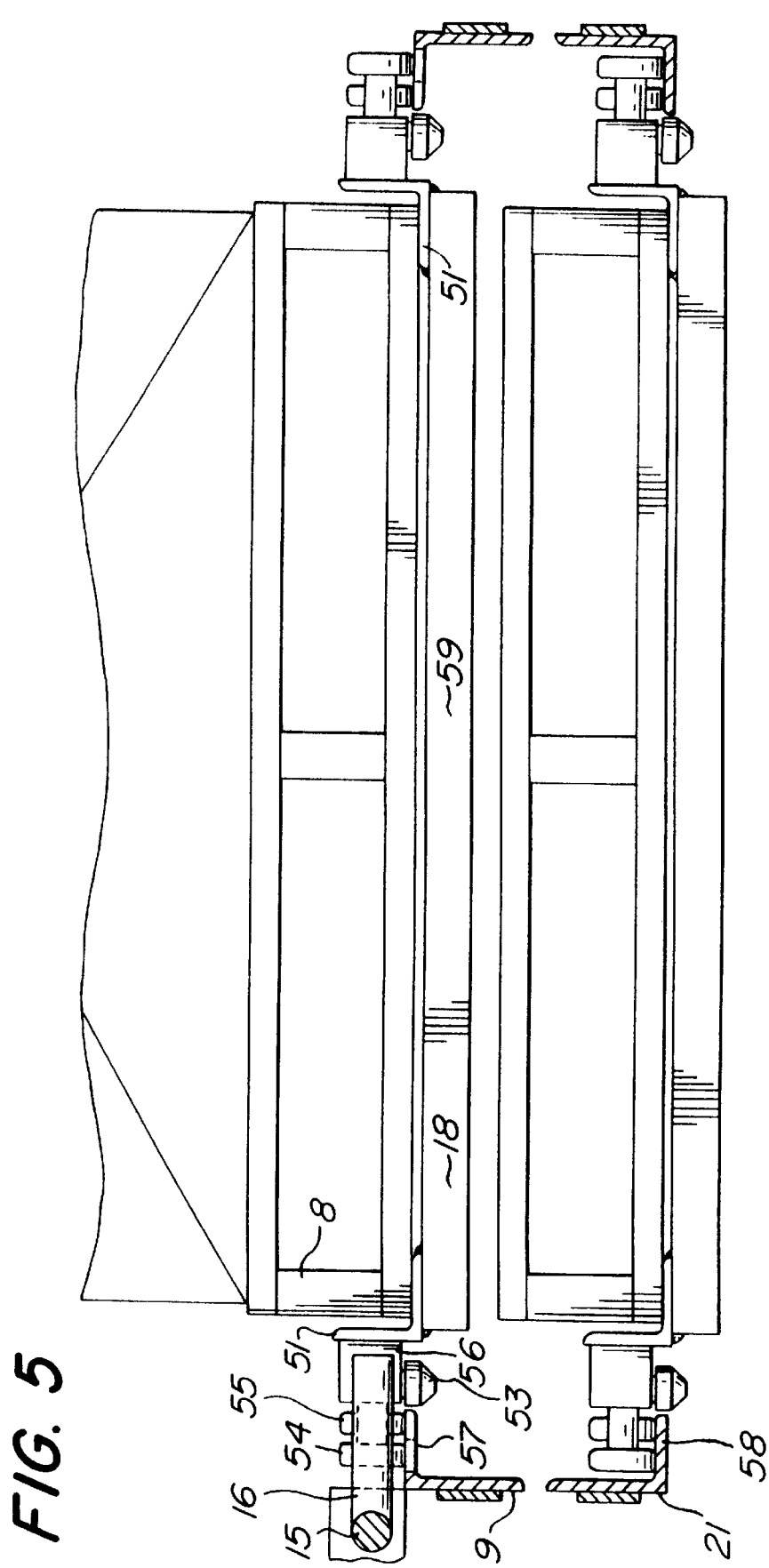

PALLET RETURN STORAGE SYSTEM

BACKGROUND OF THE INVENTION

This invention relates to a pallet rack storage system. More particularly, this invention relates to an improvement in multiple cart systems in which a braking means is used to impede a cart's speed, minimize impact with companion carts, and avoid damage to goods and equipment.

The system served by this invention is one in which pallet return racks operate on a two-level rail assembly; the wheeled carts operate on at least one pair of spaced apart parallel feed rails and at least one pair of spaced apart parallel return rails, both of which have an unloading front end and a loading rear end. At least one cart is in rolling engagement with the feed rails and capable of being automatically transferred to the return rails below. Typical of this system is the one described by A. Konstant in U.S. Pat. No. 5,170,896.

The present invention improves on U.S. Pat. No. 5,170,896 by automatically transferring carts from the unloading end of the feed rails to rolling engagement with the front end of the return rails. Included is a release mechanism for selectively transferring carts from the feed rails to the return rails while permitting loaded carts to remain in a storage position. The feed rails are sloped upwardly from the front end to the rear end at a gradual angle and the return rails are sloped downwardly from the front end to the rear end, also at a gradual angle. The upward slope of the feed rails allows for a smooth flow of loaded carts to the unloading end for storage and/or unloading. After the cart has been unloaded and the release mechanism activated, the cart is selectively and automatically transferred from the feed rails to a rolling engagement with the return rails.

The downward slope of the return rails also results in a smooth flow of the carts to the loading end where the carts and pallets may either be repositioned on the rear end of the feed rails for reuse or stored for subsequent use. Although this system works well with a single pallet it is not as efficient when multiple pallets are used because the carts accelerate as they travel down the feed rails and they can impact stationary carts. As a result, there is always the potential for damage to carts and goods as well as the risk of injury.

Accordingly, there is a need for a conveyancing system which eliminates and/or reduces impact between carts in pallet rack storage systems and which eliminates the likelihood of damage and injury to equipment and personnel.

SUMMARY OF THE INVENTION

The present invention is an improvement on U.S. Pat. No. 5,170,896 because it avoids and/or minimizes impact between multiple carts in pallet return systems.

In general, this device consists of a frame to which is attached at least one pair of spaced apart parallel feed rails which have the ability to serve at least two carts. The feed rails are on an incline with the loading end in an elevated position relative to the lower unloading end.

Below the feed rails, there is disposed at least one pair of spaced apart parallel return rails connected to the frame. These return rails also have an elevated transfer end and a lower exit end which correspond to the unloading end and loading end, respectively, of the feed rails. The return rails are also equipped with at least two carts which have wheels for rolling engagement with the rolling surfaces of the feed rails and the return rails. A release means transfers the carts from the feed rails to the return rails so that the carts can be put into rolling engagement with the latter. The release means includes a release position for effecting transfer, a stop position to prevent transfer, and a braking means for controlling a cart's speed and reducing impact between carts.

This invention also provides an improved alternative means for automatically transferring a cart from the feed rails to the return rails without having to utilize the release means. This alternative depends on a certain synergy between the rails and carts and, more specifically, it requires that the distance between each parallel set of feed rails be narrower than the width of the pallet so that when a pallet lies atop a cart, it will extend beyond its width. When so disposed, this alternative means will allow the cart to drop through the feed rails and onto the return rails while simultaneously depositing its pallet load onto the feed rails.

BRIEF DESCRIPTION OF THE DRAWINGS

This invention is best understood by reference to the drawings, wherein the reference numerals refer to like-numbered elements in the specification:

FIG. 1 shows a top view of a section of a side arrangement of the rack system;

FIG. 2 is a cross-sectional view of the rack system of FIG. 1 shown along line 2—2 with a pallet load in phantom;

FIG. 3 shows a cross-sectional side view of the rack system of FIG. 1 shown along line 3—3;

FIG. 4 is a detailed cross-sectional side view of the cart of FIG. 1 shown along line 4—4 with a pallet load in phantom;

FIG. 5 is a cross-sectional front view of the rack system illustrated in FIG. 2 along line 5—5;

DETAILED DESCRIPTION OF THE PRESENT INVENTION

Figure 6:
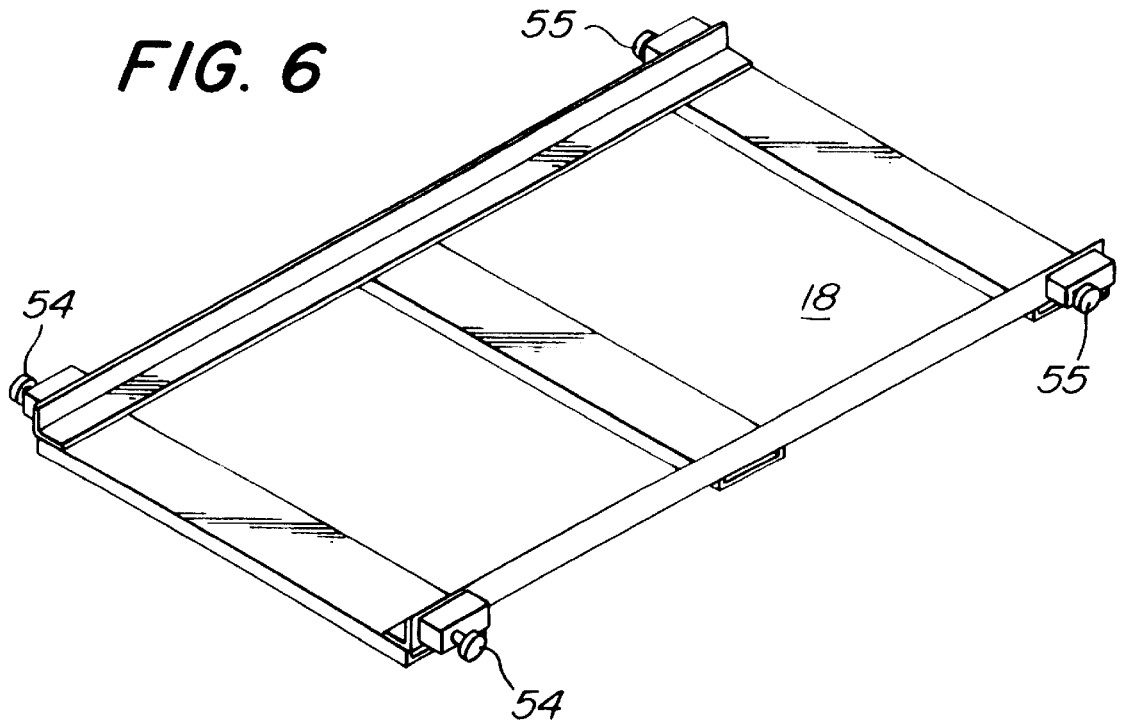
FIG. 6 shows a perspective view of a cart used in the rack system of this invention.

This invention provides for a multiple cart pallet return rack system for minimizing impact between carts. This system consists essentially of a frame with at least one pair of spaced apart parallel feed rails having an elevated loading end and an unloading end whose feed rails lie below that of the loading end.

Below the feed rails and joined to the frame are at least one pair of spaced apart parallel return rails having a transfer end and an exit end which correspond to the unloading end and the loading end of the feed rails, respectively. This device is equipped with at least two carts which have wheels for rolling engagement with the rolling surfaces of the feed rails and the return rails. A release means transfers the carts from the feed rails to the return rails so that the cart is put into rolling engagement with the return rails. The release means is equipped with a release position for effecting the transfer, a stop position for preventing transfer, and a braking means for controlling a cart's speed and avoiding impact between carts.

FRAME

Details of the frame are depicted in FIG. 1 which shows a top view of an end section of a side-by-side rack system. In practice, when installed, these systems may be stacked one on top of another to create a rack structure (not shown), or they may be installed in a side-by-side relationship (as shown), or both.

The rails are supported by vertical frames which are part of the overall support structure and they are joined thereto by horizontal load beams or by other means known in the art. In the side-by-side arrangement of FIG. 1, the frame joins the feed rails, depicted here as first and second feed rails 9 and 10, and also joins two pairs of return rails which are located below the feed rails (not shown in FIG. 1).

Addressing the device from the unload end 11 to the load end 12, a first frame 1 is located nearest to the unload end 11 followed by a monopost 13 and a second frame 7. As shown, the rack system has a center frame 6 located between the first and second feed rails 9,10. The center frame 6 adds support to the feed rails 9,10 at the load end 12 to obviate the need for a load beam across load end 12. In this manner, the load end of the rails can be secured not only to the second frame 7, but also to the center frame 6 to add rigidity. The open load end provides for easy access for a forklift to remove the empty carts and/or pallets from the return rails.

Addressing the load beams from load end to unload end, a second beam 5 is depicted. This beam is a half load beam and it has bolted connectors such as can be bolted into the second frame 7, and into the center frame 6. In multiple section rack systems, a second frame beam is bolted onto either side of the second beam 5 and a third full beam 4 is connected to the monopost 13, and spans each monopost. Next, a fourth beam 3 connects to first frame 1, and finally, a fifth beam 14 is located at the unload end 11. This fifth beam 14 has the appropriate hole punching attachments to terminate the rails, and runs from first frame 1 to first frame 1 in multiple section rack systems.

RAILS

Figure 9:
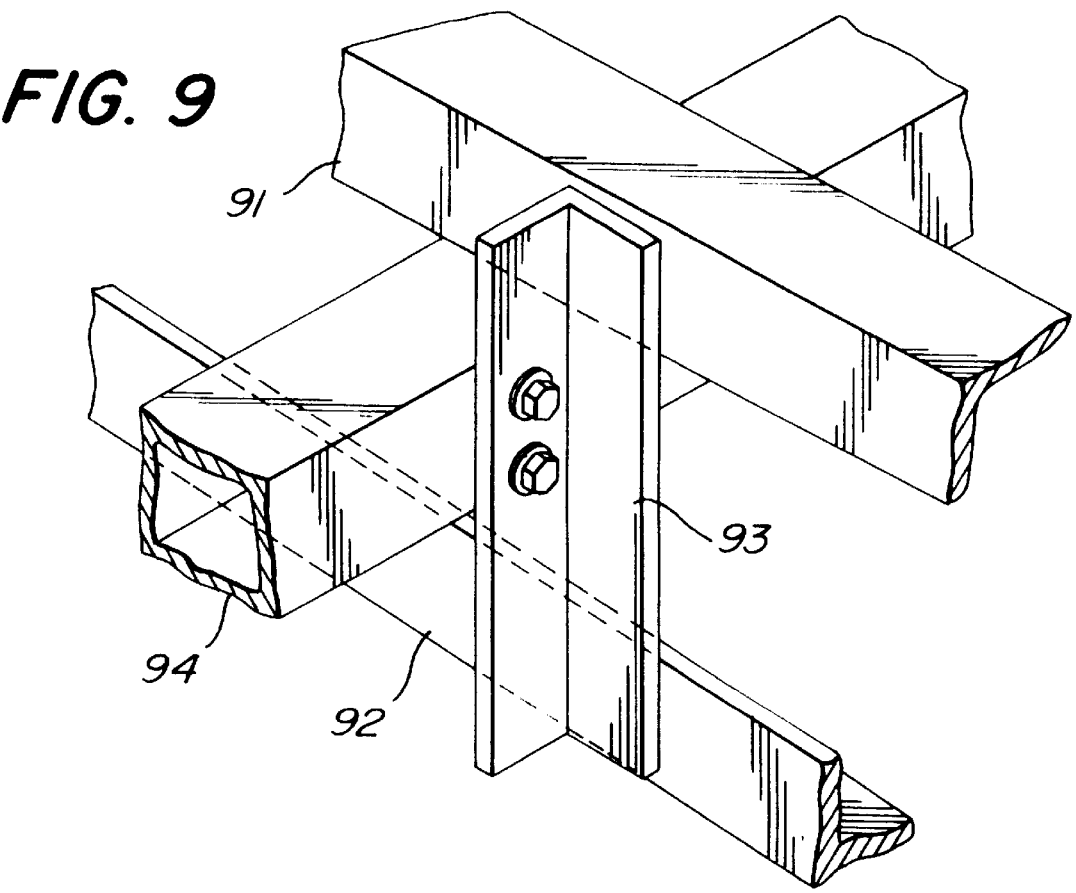
FIG. 9 is a perspective view showing means for connecting rails to the frame.

As shown in FIG. 2, first feed rails 9 are positioned above return rails 21 and are sloped upwardly from the load end 12 to the unload end 11 at a gradual angle. Return rails 21 are sloped downwardly from the unload end 11 to the load end 12, also at a gradual angle. One connection means of the rails to the support beams is shown in FIG. 9 where a feed rail 91 and a return rail 92 are connected to a support beam 94 by a connector 93.

FIG. 3 shows a rack system supporting a multiplicity of carts. In this embodiment, the feed rails 10 are supporting four loaded carts, 32, 33, 34, and 35, and the return rails 31 are shown with empty pallets 36. It should be understood, however, that feed rails 10 can be designed to support any number of loaded carts provided that the rails and support structure have adequate strength to handle the loads. A front cross-sectional view of the rails is given in FIG. 5, and it is to be understood from this that the right-hand portion of the rack system therein shown is a mirror image of the left-hand portion. Here, angle members are used as the feed rails 9 and the return rails 21 and their respective rolling surfaces 57 and 58 provide means for allowing the cart 18 to roll along the length of the track. Although angle members are shown for the feed and return rails 9 and 21, it will be readily understood that other structural members having different cross-sectional shapes may also be employed and are considered as being within the scope of this invention.

CARTS

Figure 8:
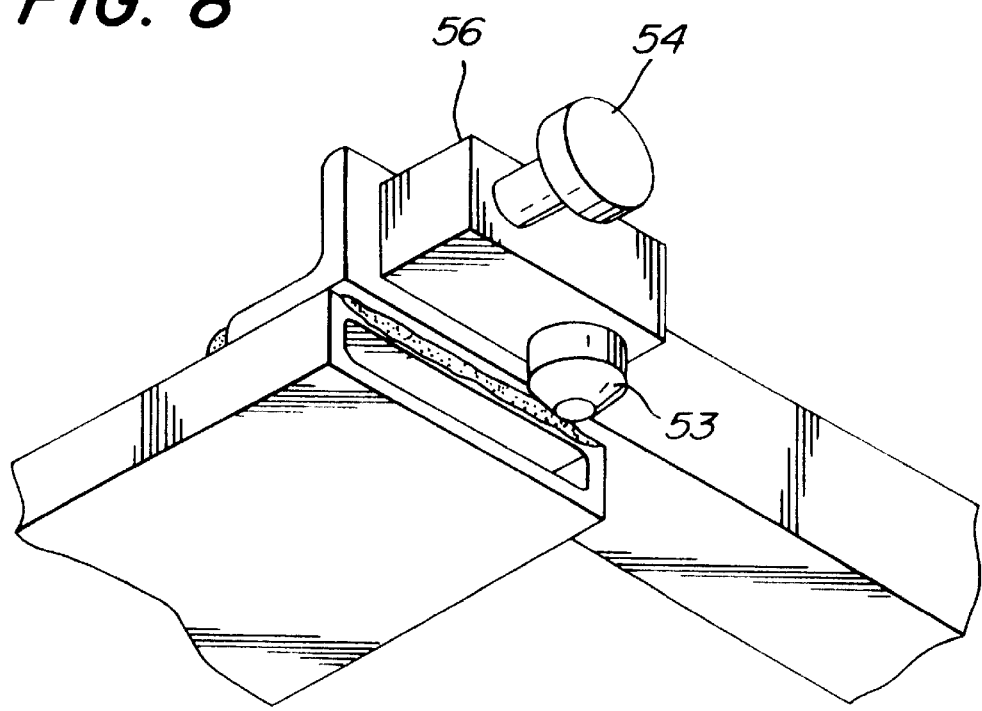
FIG. 8 is a perspective view of a wheel assembly.

The basic cart 18 (FIG. 5) includes a cross brace 59, sides 51 connected to the cross brace, and multiple wheel assemblies 56 mounted to the sides 51. A pair of front wheels 54 and a pair of rear wheels 55 are rotatably mounted to the sides 51. A detailed drawing of a wheel assembly is shown in FIG. 8.

Figure 7:
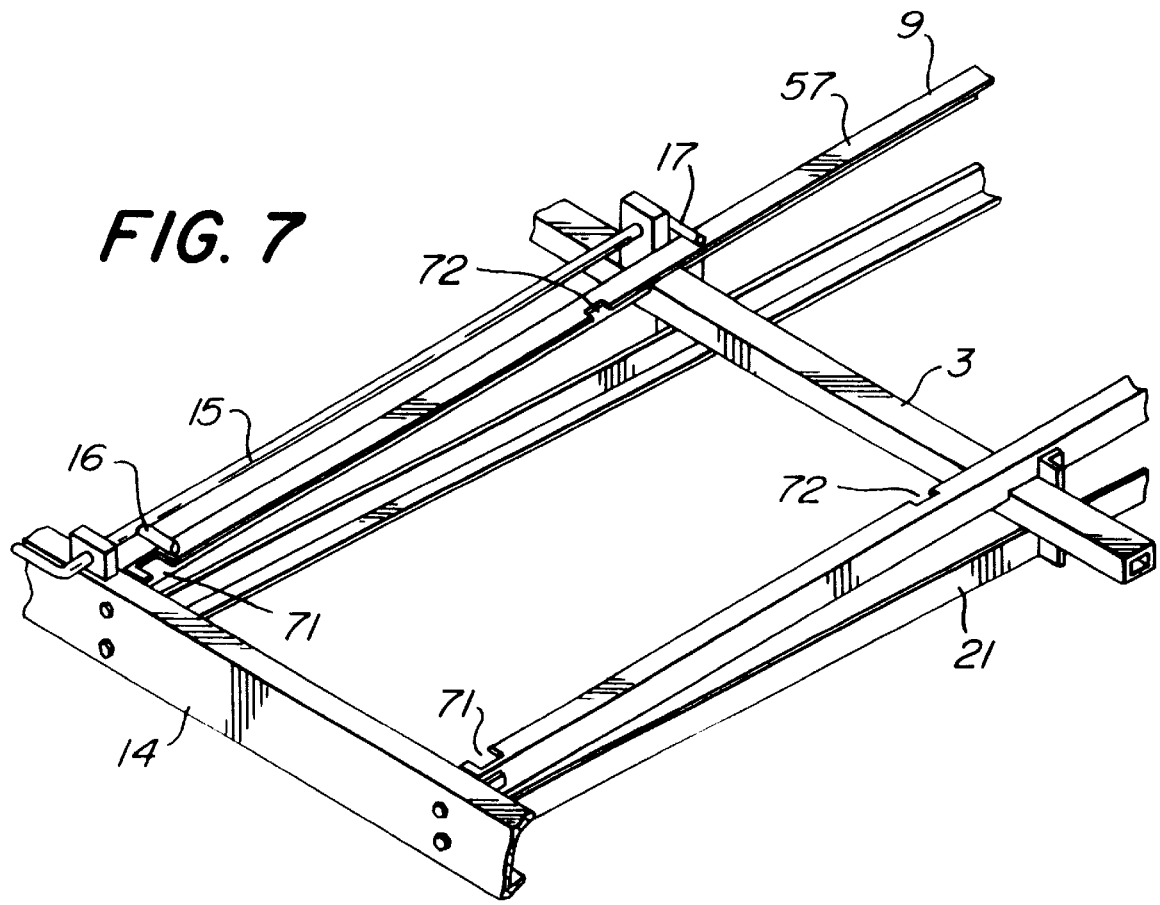
FIG. 7 is a perspective view showing means for transferring and releasing carts from one set of rails to another.

According to one embodiment, the front wheels 54 extend laterally beyond the width of cart 18 to a distance greater than rear wheels 55 as depicted in FIG. 5. This distance is sufficient for the front wheels 54 to roll forward on rolling surfaces 57 of feed rails 9 without interference from or passing through rear notches 72 (FIG. 7). Cart 18 may be further provided with a pair of front guide wheels 53, and also, a pair of rear guide wheels 22 which are positioned adjacent to the edge of the feed rails and return rails (FIGS. 2, 5, and 8). The guide wheels maintain the cart 18 in proper lateral alignment and provide smooth operation as the cart 18 rolls along feed rails 9; however it will be apparent to those of ordinary skill that other methods for guiding the cart as well as other means for securing guide wheels 53 and 22 to cart 18 may also be employed without departing from the spirit or scope of this invention.

There are basically two alternate designs for the cart. In one embodiment, the sides 51 are spaced to receive a pallet 8 as shown in FIG. 5. The pallet 8 fits inside the cart 18, and can accompany the cart back to the load end after transfer as shown in FIG. 4.

Figure 11:
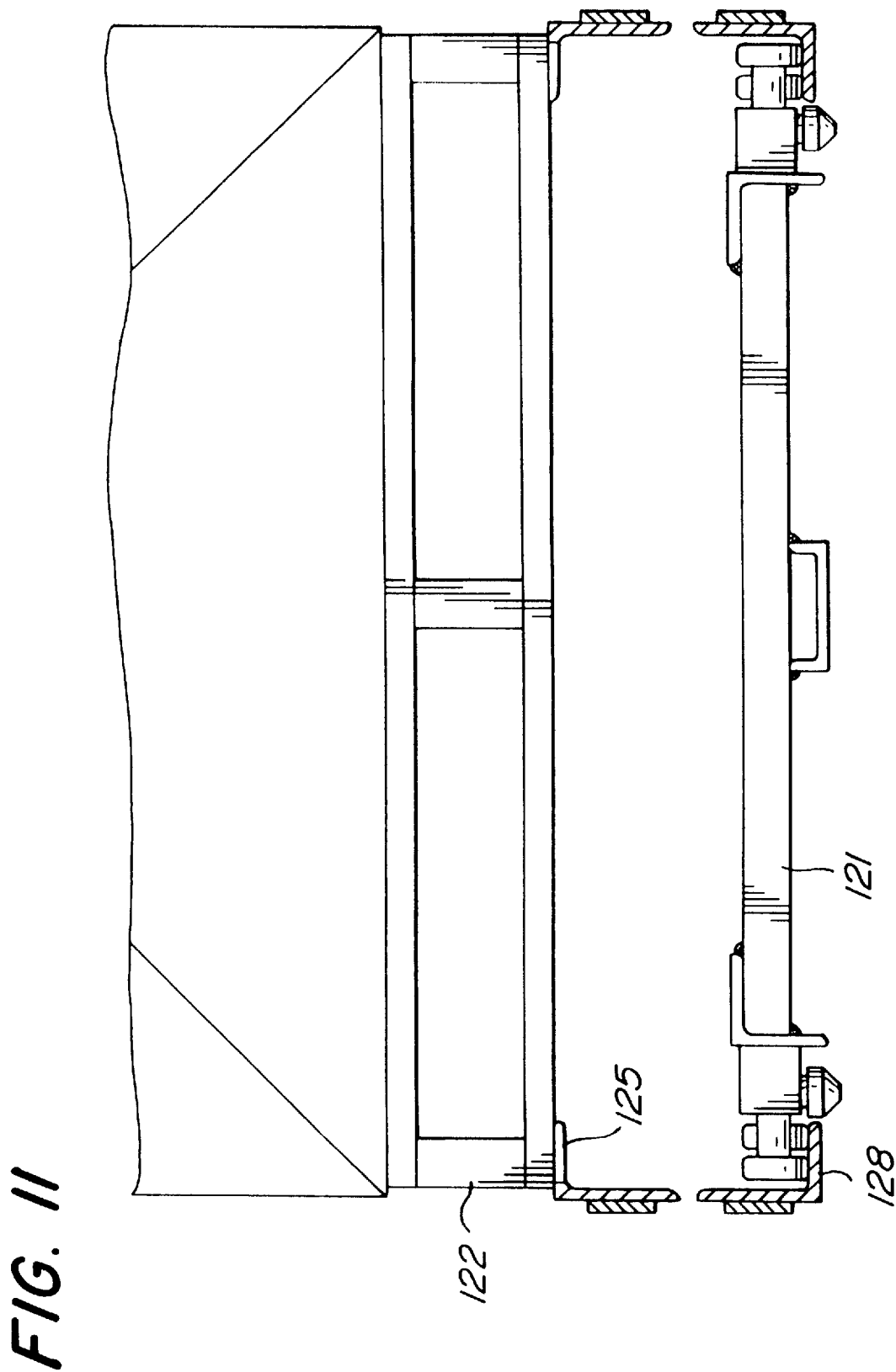
FIG. 11 is a cross-sectional front view of the embodiment shown in FIG. 10 along line 11—11.
Figure 12:
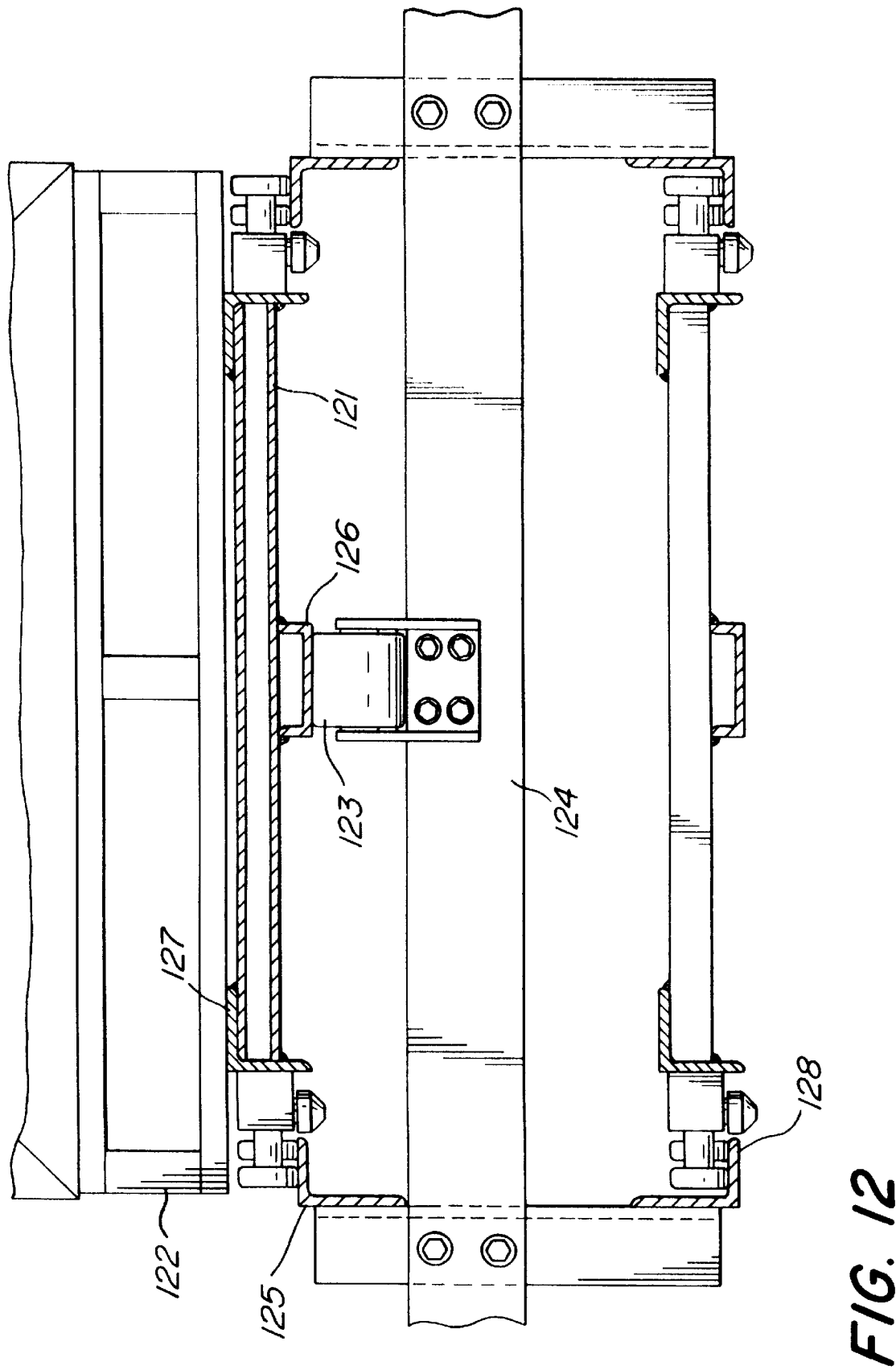
FIG. 12 is a cross-sectional front view of the alternate braking means shown in FIG. 10 along line 12—12.
Figure 13:
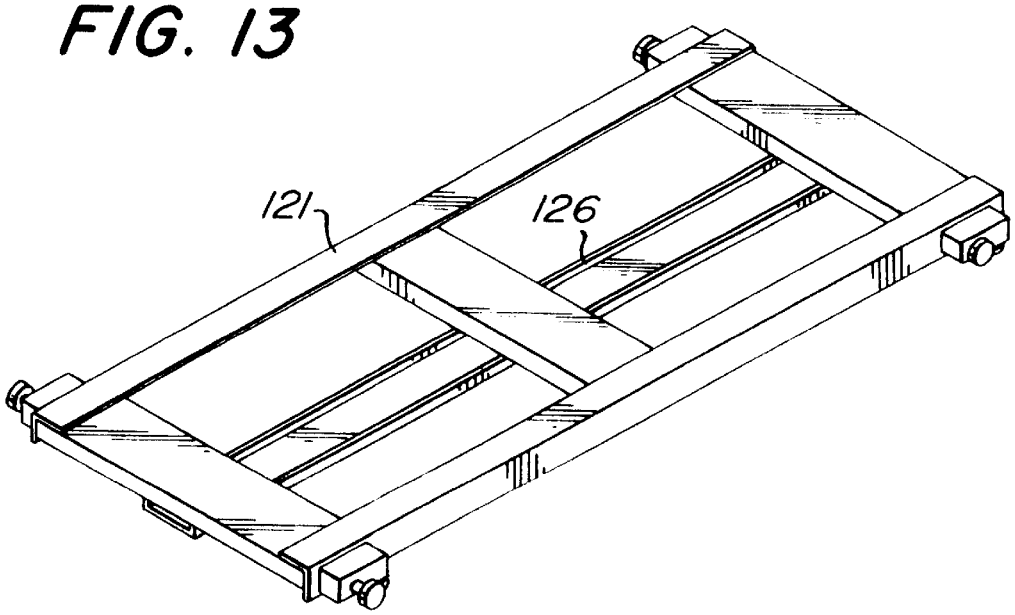
FIG. 13 is a perspective view of an alternate cart assembly supporting a pallet.

A second embodiment is shown in FIGS. 12 and 13 where the sides 127 are spaced such that the pallet 122 rests on top of the cart 121. As described below, the cart 121 can drop through the feed rails 125 onto the return rails 128 to deposit the pallet 122 on the feed rails 125 as shown in FIG. 11. This transfer can be accomplished automatically without the need for release means.

TRANSFER MEANS

As shown in FIGS. 6 and 7, feed rails 9 are provided with front notches 71 and rear notches 72. A preferred embodiment provides for notches of varying depth with front notches 71 having a depth of substantially all of the rolling surface 57, and the rear notches 72 having a depth less than that of front notches 71. In particular, rear notches 72 are depth-proportioned to permit a pair of front wheels 54 of cart 18 (FIG. 6) to roll forward on rolling surfaces 57 of feed rails 9, unobstructed by rear notches 72. Front notches 71 are of a width sufficient to accommodate the through passage of front wheels 54 of cart 18. Rear notches 72 are also of a width sufficient to accommodate the through passage of a pair of rear wheels 55 of cart 18. Rear notches 72 are located towards the load end 12 along upper rolling surface 57 at a distance that coincides with the distance between front wheels 54 and rear wheels 55 of cart 18. In this manner, the transfer of cart 18 may be accomplished. Other transfer means will be apparent to those of ordinary skill in the art.

The known transfer means relies on a release mechanism (described below) to effect the transfer of the cart from the feed rails to the return rails. Typically, a pallet is unloaded and then both the cart and the pallet transferred, or the pallet is removed and then the cart is released for return to the load end.

By contrast, the present invention provides means for automatically transferring the cart to the return rails while simultaneously depositing the pallet on the feed rails. This is achieved by making the distance between each feed rail 125 narrower than the width of pallet 122 as shown in FIG. 12. The cart 121 is adapted to receive the pallet 122 so that both rest atop and, at the same time, extend beyond the width of the cart 121. In this way, the transfer means allows the cart 121 to drop through the feed rails onto the return rails 128 while depositing the pallet 122 onto the feed rails (FIG. 11). This transfer is done automatically without the need for the release means.

RELEASE MEANS

This invention also provides an improved release means for use in multiple cart rack systems, one of which is shown in FIG. 7. In this embodiment, the release means comprises a rod 15 rotatably mounted to the frame near the unload end and running substantially parallel to the feed rails 9. The rod has first stop 16 located near the unload end, and a second stop 17 located approximately one cart length behind the first stop 16 relative to the unload end. These stops are mounted to the rod such that when the rod 15 rotates to a stop position as shown in FIG. 7, the first stop 16 contacts a first cart closest to the unload end, and the second stop 17 contacts a second cart behind the first cart. In this way, the force which the second cart exerts against the first cart is reduced and the carts are secured. Conversely, when the rod 15 is rotated to a release position, the stops avoid contacting the carts and cart 18 rolls completely forward until the front wheels 54 meet front notches 71 and rear wheels 55 meet rear notches 72. In this manner, cart 18 falls through the front and rear notches 71 and 72 and it is automatically transferred to a rolling engagement with the return rails. According to still another embodiment, springs (not shown) are provided to bias rod 15 and stops 16 and 17 to the stopped position.

BRAKING MEANS

The braking means impede the speed of a cart to reduce its impact with other carts, thereby avoiding damage to goods and equipment, and reducing the risk of personal injury. In one preferred embodiment, the braking means comprises an energy absorbing wheel which can be substituted for any one of the front, rear, or guide wheels. This wheel, also known as a hysteresis wheel is comprised of a high grade polyurethane polymer that is resilient, energy absorbing, elastomeric, and durable. As the tire deforms under the weight of the pallet, kinetic energy is converted to heat and the distorted tire exerts a frictional braking action on the rolling surfaces.

Figure 10:
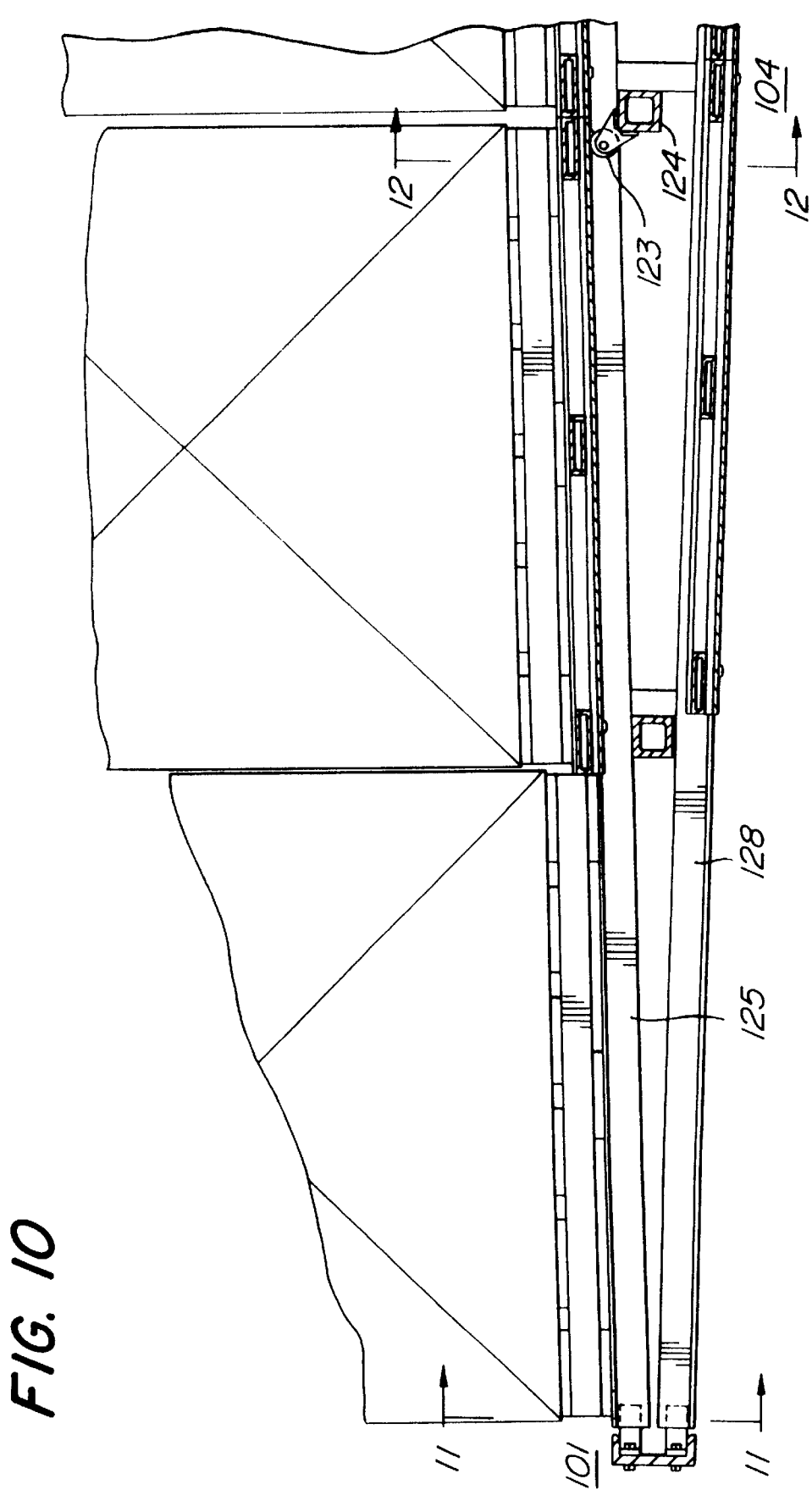
FIG. 10 is a cross-sectional side view of a preferred embodiment showing a pallet atop a cart and an alternate stationary braking means.
Figure 14:
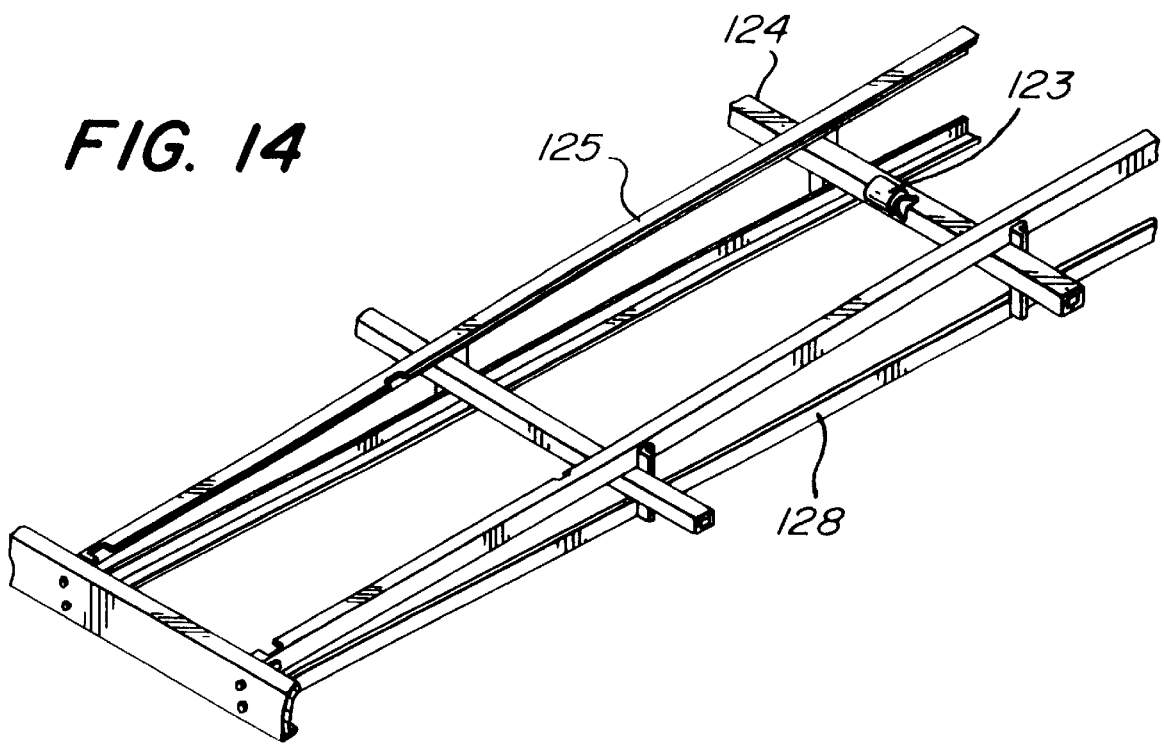
FIG. 14 is a perspective view of an alternate braking means.

Alternatively, a stationary braking means may be used as shown in FIGS. 10, 12, and 14. In FIGS. 12 and 14 a stationary centrifugal brake 123 of known type is shown mounted to a cross brace 124. The cart 121 has a center member 126 to contact the stationary brake 123 and as it rolls down the feed rails, it is met by the stationary brake which absorbs a portion of its kinetic energy. The positioning of the stationary brake along the feed rails is shown in FIG. 10 where the stationary brake 123 is approximately two cart lengths away from the unload end 101. Depending upon the number of carts which the rack system is designed to serve, additional stationary brakes may be mounted behind the first brake towards the load end 104. Each brake is mounted essentially a cart length behind the brake in front of it. Therefore, the number of stationary brakes needed should be one less than the number of carts which the system serves. For example, a rack system designed to handle two carts would have one brake, a three cart system would have two brakes, and so on.

While the preferred embodiments have been fully described and depicted for the purposes of explaining the principles of the present invention, it will be appreciated by those skilled in the art that modifications and changes may be made thereto without departing from the scope of the invention set forth in the appended claims.

What is claimed is:

1. A pallet return system comprising:
   a. at least one pair of spaced apart parallel feed rails mounted to a cross brace and having rolling surfaces for accommodating at least two carts, said feed rails having an unloading end and a loading end, said loading end being elevated above said unloading end;
   b. at least one pair of spaced apart parallel return rails having rolling surfaces, said return rails being positioned below said feed rails, said return rails having a transfer end and an exit end corresponding to said unloading end and said loading end, respectively, said transfer end being elevated above said exit end;
   c. at least two carts having wheels for rolling engagement with said rolling surface of said feed rails and said return rails;
   d. a transfer means for transferring said carts from said feed rails to said return rails such that said cart is in rolling engagement with said return rails;
   e. release means for transferring said carts from said feed rails to said return rails, said release means having a release position to effect transfer, and a stop position to prevent transfer; and
   f. braking means for controlling the speed of a cart to reduce impact between said carts; said braking means comprising a stationary centrifugal brake mounted to said cross brace in proximity to said feed rails such that it comes into contact with at least one of said carts.

2. The device of claim 1, wherein said braking means comprises at least one energy absorbing wheel mounted to said cart.

3. The device of claim 2, wherein said energy absorbing wheel has hysteresis properties.

4. The device of claim 1, wherein said wheels comprise front wheels and rear wheels, said transfer means comprises a pair of front notches in said feed rails adapted to receive said front wheels, and a pair of rear notches adapted to receive said rear wheels, and said release means comprises a rod rotatably mounted to said frame near said unload end and running substantially parallel to said feed rails, said rod having a first and second stop, said first stop being located towards said unload end, and said second stop being located approximately one cart length behind said first stop relative to said unload end, said stops being mounted to said rod such that when said rod rotates to said stop position, said first stop contacts the first cart closest to said unload end and said second stop contacts the second cart behind said first cart to reduce the force said second cart applies against said first cart, and when said rod rotates to said release position, said stops avoid contacting said carts.

5. The device of claim 4 wherein said rails are greater than the width of said pallet, and wherein a cart is adapted to receive said pallet such that said pallet remains with said cart after transfer.

6. The device of claim 1, wherein said system includes a loaded pallet; said wheels comprise front wheels and rear wheels; said transfer means comprises a pair of front notches in said feed rails adapted to receive said front wheels, and a pair of rear notches adapted to receive said rear wheels; the space between said feed rails is narrower than the width of a pallet; said cart is adapted to receive said pallet such that said pallet extends beyond the width of said cart; and said release means remains in said release position to allow said cart to automatically transfer to said return rails such that said pallet is deposited on said feed rails after transfer.

7. The device of claim 5, further comprising a frame which joins at least two pairs of said feed rails, first and second feed rails, and two pairs of said return rails, in a substantially parallel, side-by-side arrangement.

8. The device of claim 7, wherein said frame comprises a center frame located between said first and second feed rails, said center frame attaches to a rail of each pair of feed rails to add rigidity to said feed rails at said load end thereby obviating the need for a support brace between each pair of rails at said load end.

9. In an improved pallet return system having:
   a. at least one pair of spaced apart parallel feed rails mounted to a cross bar and having rolling surfaces for accommodating at least two carts, said feed rails having an unloading end and a loading end, said loading end being elevated above said unloading end;
   b. at least one pair of spaced apart parallel return rails having rolling surfaces, said return rails being positioned below said feed rails, said return rails having a transfer end and an exit end corresponding to said unloading end and said loading end respectively, said transfer end being elevated above said exit end;
   c. at least two carts having wheels for rolling engagement with said rolling surface of said feed rails and said return rails;
   d. a transfer means for transferring said carts from said feed rails to said return rails such that said cart is in rolling engagement with said return rails; and
   e. release means for transferring said carts from said feed rails to said return rails, said release means having a release position to effect transfer, and a stop position to prevent transfer;

the improvement which comprises providing braking means for controlling the speed of a cart to reduce impact between said carts; said braking means comprising a stationary centrifugal brake mounted to said cross bar in proximity to said feed rails such that it comes into contact with at least one of said carts.

10. The device of claim 9, wherein said braking means comprises at least one energy absorbing wheel mounted to said cart.

11. The device of claim 10, wherein said energy absorbing wheel has hysteresis properties.

12. The device of claim 9, wherein said wheels comprise front wheels and rear wheels; said transfer means comprises a pair of front notches in said feed rails adapted to receive said front wheels, and a pair of rear notches adapted to receive said rear wheels; and said release means comprises a rod rotatably mounted to said frame near said unload end and running substantially parallel to said feed rails, said rod having a first and second stop, said first stop being located towards said unload end, and said second stop being located approximately one cart length behind said first stop relative to said unload end, said stops being mounted to said rod such that when said rod rotates to said stop position, said first stop contacts the first cart closest to said unload end and said second stop contacts the second cart behind said first cart to reduce the force said second cart exerts against said first cart, and when said rod rotates to said release position, said stops avoid contacting said carts.

13. A pallet return system comprising:
   a. a frame;
   b. at least one pair of spaced apart parallel feed rails connected to said frame, and having rolling surfaces, said feed rails having an unloading end and a loading end, said loading end being elevated above said un-loading end, said feed rails being narrower than the width of a pallet;
   c. at least one pair of spaced apart parallel return rails having rolling surfaces, said return rails being connected to said frame and positioned below said feed rails, said return rails having a transfer end and an exit end corresponding to said unloading end and said loading end, respectively, said transfer end being elevated above said exit end;
   d. at least one cart having wheels for rolling engagement with said rolling surface of said feed rails and said return rails, said wheels comprising front wheels and rear wheels, said cart adapted to receive said pallet such that said pallet extends beyond the width of said cart; and
   e. a transfer means for transferring said cart from said feed rails to said return rails such that said cart is in rolling engagement with said return rails, said transfer means comprising a pair of front notches in said feed rails adapted to receive said front wheels, and a pair of rear notches in said feed rails adapted to receive said rear wheels, said transfer means enabling said cart to drop through said feed rails onto said return rails thereby leaving said pallet on said feed rails;
   f. a release means for effecting the transfer of said cart from said feed rails to said return rails, said release means comprising a rod rotatably mounted to said frame near said unloading end and extending essentially parallel to said feed rails, including a first stop near said unloading end and a second stop approximately one cart length behind said first stop; and
   g. braking means for controlling the speed of a cart; said braking means comprising a stationary centrifugal brake wheel mounted on said frame in proximity to said feed rails such that it comes into contact with said cart.

14. The device of claim 13, wherein said feed rails have a strength and length sufficient to support at least two carts; and wherein said braking means controls the speed of said carts so as to reduce impact between said carts.

15. The device of claim 14, wherein said braking means comprises at least one energy absorbing wheel mounted to said cart.

16. The device of claim 15, wherein said energy absorbing wheel has hysteresis properties.

17. The device of claim 13, wherein said frame joins at least two pairs of said feed rails, first and second feed rails, and two pairs of said return rails, first and second return rails, in a substantially parallel, side by side arrangement; and wherein said frame comprises a center frame located between said first and second feed rails, said center frame attaches to an inboard rail of each pair of feed rails to add rigidity to said feed rails at said load end, thereby obviating the need for a support brace between each pair of rails at said load end.

18. The device of claim 1 wherein at least one of said carts includes a centrally disposed member which extends the approximate length of said cart.

19. The device of claim 18 wherein braking is achieved by bringing into contact said center member and said stationary brake.

20. The device of claim 19 wherein the number of stationary brakes employed are one less the number of carts and each brake is mounted essentially a cart length behind the brake in front.

21. The device of claim 9 wherein at least one of said carts includes a centrally disposed member which extends the approximate length of said cart.

22. The device of claim 21 wherein braking is achieved by bringing into contact said center member and said stationary brake.

23. The device of claim 22 wherein the number of stationary brakes employed are one less the number of carts and each brake is mounted essentially a cart length behind the brake in front.

24. The device of claim 13 wherein at least one of said carts includes a centrally disposed member which extends the approximate length of said cart.

25. The device of claim 24 wherein braking is achieved by bringing into contact said center member and said stationary brake.

26. The device of claim 25 wherein the number of stationary brakes employed are one less the number of carts and each brake is mounted essentially a cart length behind the brake in front.

* * * * *